Nov. 13, 1934.  C. B. MARTIN ET AL  1,980,419
BACKING-UP RING FOR WELDING
Filed April 13, 1933  2 Sheets-Sheet 1
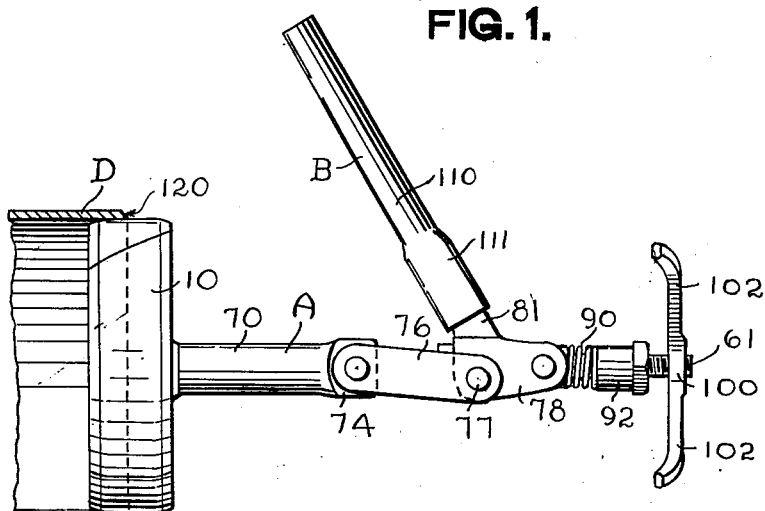
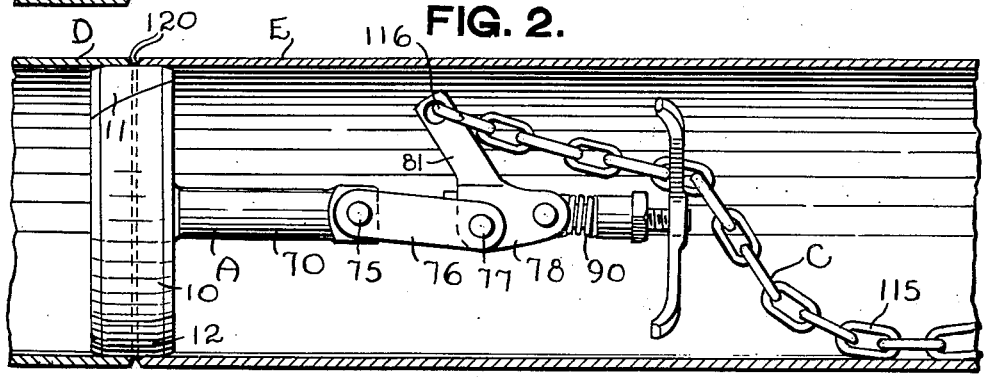
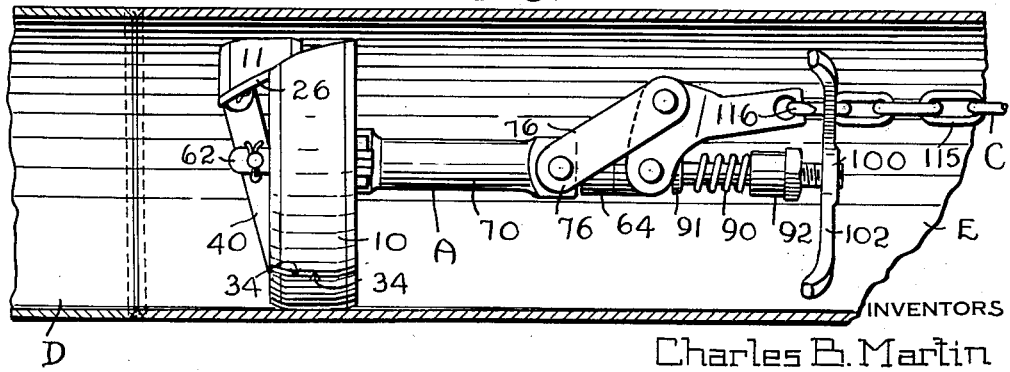
INVENTORS
Charles B. Martin
L. W. Lemert
BY Lancaster, Allwine and Rommel
ATTORNEYS.

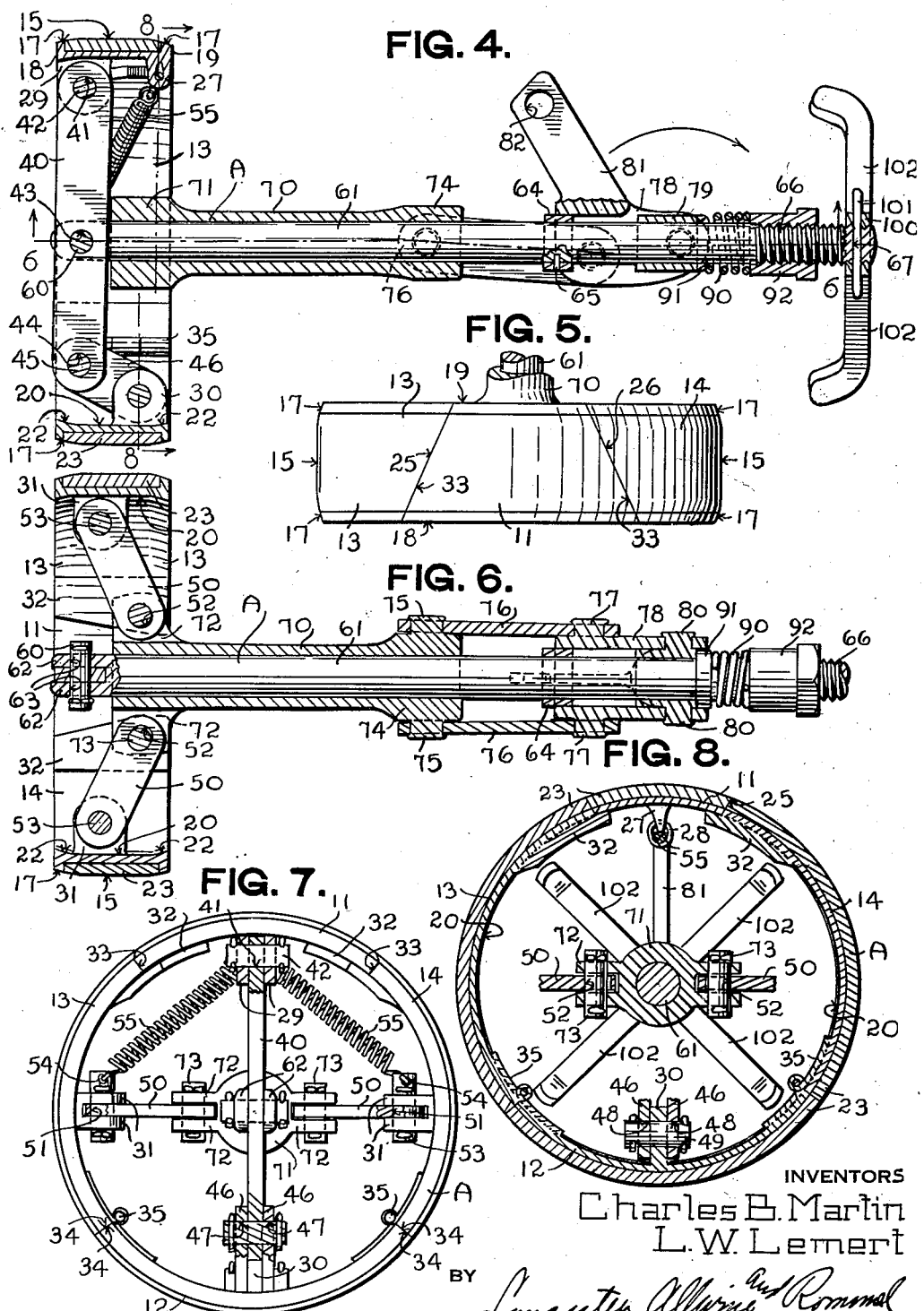

Patented Nov. 13, 1934

1,980,419

UNITED STATES PATENT OFFICE 1,980,419

BACKING-UP RING FOR WELDING

Charles B. Martin and Louis Wirt Lemert, Bartlesville, Okla.

Application April 13, 1933, Serial No. 666,060

14 Claims. (Cl. 113—103)

This invention relates to mandrels used in pipe welding operations and more particularly to backing-up rings employed for those operations.

The primary object is to provide a backing-up ring for pipe welding which ring may be expanded to fit the bore of the pipe sections to be butt welded and which will not be difficult to remove when the welding operations are completed.

Another object is to provide such a backing-up ring, made up of segmental portions, with their abutting end faces so disposed that there are no thin nor sharp edges which would be apt to fuse into the welds.

Another object is to provide an expansible backing-up ring which may be expanded to fit the bore of a large range size of tubes and pipes.

Still another object is to provide a contractable and expansible backing-up ring which is easily locked into an expanded position and will remain in that position, with the backing-up ring and its locking structure wholly within the pipes or tubes being welded, until unlocked and removed.

Another object is to provide such a device which will not be apt to move forwardly into the tube when in the proper position and while being locked.

Another object is to provide an expansible backing-up ring employing a wedge, but the expansion of which is not dependent wholly upon the wedge and is in an outward direction from the center of the ring.

Yet another object is to provide such an apparatus, which comprises at least three segments in addition to the wedge and which segments are hinged together, there being no hinge directly opposite the wedge, so that contraction of the ring takes place along at least three faces of the same.

Another object is to provide a construction for a backing-up ring, having a wedge member, which construction will eliminate the binding of the wedge with the pipe or tube.

Other objects and advantages of the invention will be apparent during the course of the following detailed description, taken in connection with the accompanying drawings forming a part of this specification, and in which drawings:—

Figure 1 is a side elevation of the improved backing-up ring expanded within the bore of a pipe which is shown in cross section.

Figure 2 is a similar side elevation with a second pipe, also shown in cross section, abutting the pipe shown in Figure 1 and the pipes ready for welding.

Figure 3 is a similar side elevation with the weld completed and the backing-up ring contracted and being removed.

Figure 4 is a vertical section thru the improved backing-up ring in a locked and expanded position.

Figure 5 is a plan view of a ring member forming a part of the backing-up ring structure.

Figure 6 is a view substantially on the line 6—6 of Figure 4.

Figure 7 is a front elevation of the improved backing-up ring in an expanded position.

Figure 8 is a view substantially on the line 8—8 of Figure 4.

In the accompanying drawings, wherein for the purpose of illustration is shown only a preferred embodiment of the invention and wherein similar reference characters designate corresponding parts thruout the several views, the letter A designates generally the improved backing-up ring, B an extension lever handle therefor, C a lever manipulating element adapted to take the place of B, and D and E pipe sections to be butt welded.

The improved backing-up ring A includes a ring member 10 made up of a plurality of elongate segmental portions which, in the example shown, comprise a wedge portion 11, a segmental portion 12 opposite the wedge portion 11 and a pair of segmental portions 13 and 14 facing each other and disposed at either end of the portions 11 and 12.

The transverse cross section of each portion 11 and 14 as shown in Figures 4 and 6, is such that the outer face 15 of each section is relatively flat at the intermediate portion thereof and convex as at 17 towards the sides 18 and 19 of the portion,—the side 18 being regarded as the outer side of the portion and the side 19 as the inner side thereof. It is preferred that the inner face 20 of the portions 11 to 14 be correspondingly flat at its intermediate portion and concave as at 22 towards the sides 18 and 19.

From Figures 4 and 5 it will be seen that these outer faces 15 are made up of a central strip 23 of relatively non-fusible metal such as copper or brass, set into and secured to the body of the portion in any approved way, the remainder of the body being preferably steel.

As for the wedge-shaped segmental portion 11, this is relatively long at its outer side 18 where it preferably comprises about 80° of the circumference of the ring member and narrows at its inner side 19 to about 55°. The end faces 25 and 26 of this portion are smooth and flat and their planes extend towards the axis of the ring member so that the portion 11 will have no knife-like edges.

Preferably on the lateral medial line of this portion and extending radially from the inner face 20 close to the inner side 19 is an eye 27 and a small ring 28 may depend therefrom, both for a purpose later described. Also extending inwardly from this face 20 and close to the outer side 18 are a pair of spaced apart apertured lugs 29.

The portion 12 is preferably the longest one and is so disposed with reference to the portion 11 that their lateral medial lines substantially align. Close adjacent the inner side 19 of this portion is an inwardly extending apertured lug 30.

Each of the pairs of portions 13 and 14 is provided with a pair of inwardly extending spaced apart lugs 31 which are disposed to one side of both the longitudinal and lateral medial lines of this pair of portions, as is shown in Figures 6 and 7. These portions 13 and 14 are each provided with a shoulder or guide 32 extending beyond one of their end faces 33. These end faces 33 diverge and are complementary to the end faces 25 and 26 of the portion 11 so that when the ring is assembled and expanded, the face 33 of the portion 13 abuts the face 25 of the portion 11 and the face 33 of the portion 14 abuts the face 26 of the portion 11. These shoulders 32 carry and guide the portion 11 and permit it to slide backwardly and forwardly in expanding and contracting the ring member.

It will be seen particularly in Figure 7 that the extended plane of the abutting end faces 34 of each portion 12, 13 and 14 will normally substantially intersect the axis of the ring member. The portions 12, 13 and 14 are joined together at these faces 34 by suitable means, such as leaf hinges 35, welded or otherwise secured to the portion.

A link or lever 40 is provided having a perforation 41 at one end and by means of a suitable pin 42 passing thru this perforation and the apertured lugs 29, is pivoted at one end to the portion 11. The lever 40, intermediate its ends, is provided with a second perforation 43 and by a third perforation 44 adjacent its opposite end. It will be seen from Figures 4 and 7 that this lever 40 is less in length than the diameter of the inner circumference of the ring member 10 and pivoted to the end carrying the third perforation 44, as by suitable pin 45, are a pair of short links 46 having apertures 47 and 48 at their opposite ends, with a suitable pin 49 passing thru the apertures 48 and the apertured lug 30, thus operatively connecting the lever 30 to the portion 12.

A pair of struts or links 50 are also provided, having perforations 51 and 52 at their ends and are secured to the sections 13 and 14 by means of suitable pins 53 passing thru the perforations 51 and apertured lugs 31. These pins 53 preferably have small perforations 54 adjacent one of their ends thru which are hooked or otherwise secured one end of a pair of retractable coil springs 55, the other ends of the springs being suitably secured to the ring 28. As a consequence, the coil springs connect the portions 13 and 14 to the portion 11.

Pivotally connected by suitable pin 60 passing thru the perforation 43 of the lever 40 is an elongate rod 61 having a split end 62 engaging the sides of the lever 40, and a perforation 63 for the pin 60. The rod extends backwardly from the ring member 10 and is provided intermediate its ends with a bearing 64 suitably keyed thereto as at 65 and the opposite end 66 of the rod 61 is preferably provided with screw threads and a perforation 67.

Adjacent the split end 62 of the rod 61 is a sleeve 70 having an enlarged collar 71 at its end nearest the ring member 10 and this collar 71 has a pair of opposed spaced apart outwardly extending apertured lugs 72. These lugs carry suitable pins 73 which pass thru the perforations 52 of the links 50 and thus pivot the links 50 to the collar 71. The opposite end 74 of the sleeve 70 is also enlarged and provided with a pair of oppositely extending spindles 75.

Pivoted at one of their ends to these spindles, are a pair of links 76 which extend towards the rear of the apparatus. The opposite ends of the links 76 are pivoted to a pair of spindles 77 which extend outwardly from a substantially inverted U-shaped lever member 78 which extends over the rod 61 and normally bears against the bearing 64. This member 78 is provided with a sleeve portion 79 about the rod 61 and having a pair of opposite spindles 80 upon which end of said member 78, opposite the end to which it is pivoted by the spindles 77 to said links 76, the member is also pivoted. Extending upwardly from the member 78 is a lever arm 81 which is of less length than the radius of the ring member 10, as shown particularly in Figures 4 and 6. The free end of this arm 81 is provided with a perforation or eye 82.

Disposed upon the rod 61 is an expansion coil spring 90 which is adapted to abut at one end the sleeve portion 79 or a suitable ring abutment 91 and at its other end to abut an adjusting nut 92 having interior screw threads to engage the screw threads upon the rod 61, thus permitting adjustment of the tension of the spring.

At the extremity of the rod 61 is a suitable guide or spider 100 which is keyed to the rod 61 at the perforation 67 by a suitable pin 101. The arms 102 of the spider extend from quadrant points about a central portion and the length of the arms are sufficiently short so that the length of an arm is not as great as the length of the radius of the ring member.

The extension lever handle B is a tubular member 110 having one end flattened as at 111 to fit over the arm 81.

As for the element C, the same is preferably a link chain 115 having a hook 116 at one end to engage the eye 82 of the arm 81. The length of this chain is preferably somewhat more than the length of the pipe section E.

The pipe sections D and E are such as are to be welded together at their ends 120.

In use, the improved backing-up ring is first contracted by throwing the lever in the direction of the arrow in Figure 4. This will cause the rod 61 to slide in the sleeve 70 and project the ends 62 beyond the plane of the side 18 of the ring member. This will cause the link 46 to swing towards the side face 18 on the pin 49 and the link 40 to pivot outwardly, drawing the wedge segmental portion 11 with it. The portion 11 will slide along the shoulders 32 and take the position shown in Figure 3. However, there will be a double tendency towards collapsing of the ring member 10 since while the wedge is being displaced as described, the links 50 are pulling the portions 13 and 14 inwardly on the hinges 35. This is caused by a slight retraction of the sleeve 70 away from the ring member 10.

When the collapsed backing-up ring is placed in the mouth of the pipe section D substantially as shown in Figure 1, the lever arm 81 aided by the extension lever handle B is thrown towards the ring member 10. This will expand the ring member and cause it to engage the bore of the pipe section. This is produced by the movement of the links 40 and 46 which take a position shown in Figure 4 and draw the wedge segmental portion 11 in engagement with the segmental portions 13 and 14. At the same time the sleeve 70 will move towards the ring member to take the position shown in Figure 4 and this will cause the link 50 to force the segmental portions 13 and 14 outwardly.

The lever arm 81 will now take the position shown in Figure 4 and the extension lever handle B may now be removed and the chain 115 substituted therefor by hooking the hook 116 into the eye 82 of the arm 81.

Thereupon, the pipe section E may be slipped over the apparatus with the ends 120 of both pipe sections in abutment. The concaved portions 17 of the outer faces of the sections 11 to 14 afford an easy guide for the drawing together of the two sections D and E.

With reference to the position of the lever member 78, i. e., the locked position of the apparatus, it will be noted that the axes of the spindles 77 will be below the axes of the spindles 75 and 80 and the member 78 will come to rest upon the bearing 64.

When the weld is completed, a pull upon the chain will throw the lever arm 81 in the direction of the arrow in Figure 4. When the parts take the position first described, the apparatus may be withdrawn thru the pipe section E, the spider guiding the device.

Since the link 40 is connected to the segmental portion 12 by the short links 46, and the spring 55 connected to the wedge segmental portion 11 and tend to pull the wedge segmental portion 11 away from the ring member, there is no possibility of the portion 11 binding against the welded pipe, as might be the case were the action pivoted at or near the center of the ring.

The spring 55 may be said to aid both in collapsing the ring member by a pull upon the wedge segmental portion 11 and the segmental portions 13 and 14. The spring 90 assists in the leverage action as is obvious. The several links connected to the segmental portions 13 and 14 force these portions in an outward direction from the axial center of the ring so that the expansion is not produced solely by the wedge segmental portion 11.

The portion 12 may be regarded as relatively immovable and the construction provided by a solid segmental portion directly opposite the wedge segmental portion 11, rather than two segmental portions joined together along the plane of the lateral medial line of the portion 11, supplemented by the shoulders, affords a ring member particularly strongly built where strains are most apt to occur.

It will be noted that the bearing 64 which is keyed to the rod 61 by the key 65 is so spaced as to prevent the rod from traveling far enough to allow the wedge segmental portion 11 to slide out of the ring member 10.

Various changes may be made to the form of invention herein shown and described, without departing from the spirit of the invention or the scope of the claims.

What is claimed is:

1. In an expansible backing-up ring for pipe welding, a ring member including a plurality of segmental portions one of said portions being wedge-shaped and the others of said portions being hingedly connected together, and means for moving the wedge-shaped portion in a plane parallel to the axis of said ring member.

2. In an expansible backing-up ring for pipe welding, a ring member including a plurality of segmental portions one of said portions being wedge-shaped and the others of said portions being hingedly connected together with at least four of their end faces normally in abutment and with the plane of said end faces normally extending to the axis of said ring member, and means for moving the wedge-shaped portion in a plane parallel to the axis of said ring member.

3. In an expansible backing-up ring for pipe welding, a ring member including a plurality of segmental portions one of said portions being wedge-shaped and the others of said portions being hingedly connected together with the intermediate section of one of said segmental portions directly opposite the intermediate section of said wedge-shaped portion, and means for moving the wedge-shaped portion in a plane parallel to the axis of said ring member.

4. In an expansible backing-up ring for pipe welding, a narrow ring member including a plurality of segmental portions one of said portions being wedge-shaped and the others of said portions being hingedly connected together and all of said segmental portions having a transverse cross section flat at the intermediate section of their outer faces and curved at the side section of their outer faces, and means for moving the wedge-shaped portion in a plane parallel to the axis of said ring member, whereby when said wedge-shaped portion is moved to cause said ring to expand, said intermediate section will provide a circumfeernce for said ring greater than the circumference of said side section.

5. In an apparatus of the class described, a ring member including a plurality of segmental portions one of said portions being wedge-shaped and two of said portions at either end of said wedge-shaped portion having shoulders with said wedge-shaped portion disposed thereon, all of said segmental portions except said wedge-shaped portion being hingedly interconnected, and means for moving the wedge-shaped portion over said shoulders.

6. In an apparatus of the class described, a ring member including a plurality of segmental portions one of said portions being wedge-shaped and two of said portions at either end of said wedge-shaped portion having converging end faces receiving the end faces of said wedge-shaped portion and also having shoulders with said wedge-shaped portion disposed thereon, all of said segmental portions except said wedge-shaped portion being hingedly interconnected, and means for moving the wedge-shaped portion over said shoulders.

7. In an apparatus of the class described, an expansible and contractable ring member including a plurality of segmental portions, one of said portions having diverging end faces, the others of said portions being interconnected and with the free end faces of two members diverging and in contact with said first named diverging end faces, one of said segmental portions disposed with its intermediate section opposite the intermediate section of said first named segmental portion, and means for moving the diverging faces of said wedge-shaped portion against the diverging faces of said other portion, including a link operatively connected to substantially the intermediate sections of said opposed segmental portions.

8. In an apparatus of the class described, an expansible and contractable ring member including a plurality of elongate segmental portions, one of said portions having diverging end faces, the others of said portions being interconnected and with the free end faces of two members diverging and in contact with said first named diverging end faces, one of said segmental portions disposed with its intermediate section opposite the intermediate section of said first named segmental portion, and means for moving the diverging faces of said wedge-shaped portion against the diverging faces of said other portions including a link operatively connected to the inner faces of said opposed portions adjacent opposite edges thereof, and on substantially the lateral medial line of said opposed segmental portions.

9. In an apparatus of the class described, an expansible and contractable ring member including a separable segmental portion providing a wedge, said portion having end faces diverging from one side of said portion and with their planes converging toward the axis of said ring member, the end faces of said ring member in contact with said diverging end faces being complementary to said end faces, and means for moving said segmental portion in a plane parallel to the axis of said ring member with said end faces of the segmental portion in contact with the complementary end faces of said ring member.

10. In an apparatus of the class described, an expansible and contractable ring member including a segmental portion providing a wedge, said portion having diverging end faces, the end faces of said ring member in contact with said diverging end faces being complementary to said diverging end faces, said ring member having a pair of guiding and reinforcing shoulders extending in angular relation to and projecting towards each other at the inward edges of the diverging end faces of said member, with said segmental portion permanently disposed upon and slidable thereon, and means cooperating with said shoulders for moving said portion over said shoulders and with the end faces of said segmental portion in contact with said end faces of said member, a portion of said means being disposed within said ring member.

11. In a backing-up ring for pipe welding, a ring member including a plurality of segmental portions, one of said portions having diverging end faces providing a wedge, the others of said portions being hingedly interconnected and with the free end faces of two members complementary to said diverging end faces and in sliding contact therewith, one of said segmental portions disposed with its intermediate section opposite the intermediate section of said wedge and two others of said segmental portions disposed with their intermediate sections substantially opposite each other, and means for operating said segmental portions to expand said ring member including a link operatively connected at one end to the intermediate section of said wedge and operatively connected at its other end to the intermediate section of said opposite segmental portion, a rod pivoted to said link intermediate the ends of said link, a collar slidable along said rod toward and away from the said link and a pair of links operatively connected at one end of each to said collar and at their opposite ends operatively connected to intermediate sections of said two others of the said segmental portions.

12. In a backing-up ring for pipe welding, a ring member including a plurality of segmental portions, one of said portions having diverging end faces providing a wedge, the others of said portions being hingedly interconnected and with the free end faces of two members complementary to said diverging end faces and in sliding contact therewith, one of said segmental portions disposed with its intermediate section opposite the intermediate section of said wedge and two others of said segmental portions disposed with their intermediate sections substantially opposite each other, and means for operating said segmental sections to expand said ring member including a link operatively connected at one end to the intermediate section of said wedge at the inner side of said wedge, a second link operatively connected at one end to the opposite end of said first named link and operatively connected at its other end to the intermediate section of said segmental portion opposite said wedge, a rod pivoted to said first named link intermediate the ends of said link, a collar slidable along said rod toward and away from the said first named link and a pair of links operatively connected at one end of each to said collar and at their opposite ends operatively connected to intermediate sections of said two others of said segmental portions, whereby movement of said rod in one direction will expand said ring.

13. In an apparatus of the class described, an expansible and contractable ring member having an outer pipe bore engaging face, said member including a segmental portion providing a wedge, said portion having diverging end faces, the end faces of said ring member in contact with said diverging end faces being complementary to said diverging end faces, said ring member provided with a band of copper set into its outer face, and means for moving said segmental portion in a plane parallel to the axis of said ring member with said diverging end faces of the segmental portion in contact with the complementary end faces of said ring member, at all times during movement of said segmental portion.

14. In a backing up ring for welding pipe sections, an expansible and contractable ring member including a segmental portion providing a wedge, said portion having diverging end faces, the end faces of said ring member in contact with said diverging end faces being complementary thereto, means, including a rod, for moving said segmental portion in a plane parallel to the axis of said ring member with said diverging end faces of the segmental portion in contact with the complementary end faces of said ring member, and means for guiding said ring member when contracted, through said pipe sections, including a member bearing against said pipe sections and retaining said rod in a position substantially aligning with the axis of said ring member.

CHARLES B. MARTIN.
LOUIS WIRT LEMERT.